United States Patent [19]

Taniguruma et al.

[11] Patent Number: 5,349,628
[45] Date of Patent: Sep. 20, 1994

[54] X-RAY PHOTOGRAPHIC EQUIPMENT

[75] Inventors: Ryuji Taniguruma, Nara; Katsuhiro Masuo, Shiga, both of Japan

[73] Assignee: Shimadzu Corporation, Kyoto, Japan

[21] Appl. No.: 56,383

[22] Filed: May 4, 1993

[30] Foreign Application Priority Data

Jun. 29, 1992 [JP] Japan .............. 4-51785[U]

[51] Int. Cl.⁵ .............................................. G03B 42/02
[52] U.S. Cl. ....................................... 378/181; 378/182; 378/172
[58] Field of Search ................ 378/170, 181, 187, 167, 378/172, 173

[56] References Cited

U.S. PATENT DOCUMENTS 4,939,764 7/1990 Markos ..................... 378/181
5,062,130 10/1991 Fago ........................ 378/181

FOREIGN PATENT DOCUMENTS 413583 6/1980 Japan .
58-4135 1/1983 Japan .

Primary Examiner—David P. Porta
Assistant Examiner—Don Wong
Attorney, Agent, or Firm—Griffin Butler Whisenhunt & Kurtossy

[57] ABSTRACT

An X-ray photographic holder adapted to use a cassette includes a carriage having the cassette placed thereon, which is reciprocally movable between a cassette loading position and a radiographic position. On the carriage a pair of grippers are provided movable in the direction perpendicular to the carriage movement. An endless belt is driven by a motor, guided by pulleys provided on the carriage and engaged with the grippers. The carriage is stopped from moving by a stopper means so long as in the cassette loading position. In this state the cassette can be gripped by the grippers so to be set in a fixed position. After this positioning, the stopper means is released to move the carriage so that the center of the cassette can be brought to a radiographic position.

8 Claims, 5 Drawing Sheets

X-RAY PHOTOGRAPHIC EQUIPMENT

FIELD OF THE INVENTION

The present invention relates to an X-ray photographic equipment. More particularly, the present invention relates to an X-ray photographic equipment adapted to use a cassette.

BACKGROUND OF THE INVENTION

An X-ray photographic equipment in the prior art is provided with a cassette holder wherein a cassette is to be loaded. The cassette holder is constructed to be moved to a radiographic position after a cassette has been loaded in a predetermined position of the cassette holder by an operator. Such cassettes have different sizes depending upon the size of a photographic object. The cassette holder is provided with a slidably movable frame, in order that a cassette of any size can be loaded in said predetermined position (for example, a center position) of the cassette holder. The operator manipulates the movable frame so to fix a cassette of any size in the interior of the cassette holder.

However, cassette loading operations and manipulations with use of the aforementioned cassette holder are unduly troublesome. To solve this problem a cassette automatic loading device without a cassette holder has been recently developed. In this automatic loading device, a cassette is disposed on a stage and there are provided positioning members independently driven from both sides of the disposed cassette, so that the cassette can be set in a determined position, and the stage is designed subsequently to be driven toward the photographic center position. According to the so defined automatic loading device, troubles caused upon effecting manipulation can be resolved, but it necessitates a driving device for moving the positioning members and another driving device for feeding the fixed cassette toward the radiographic position. This increases both the size and the weight of the equipment.

SUMMARY OF THE INVENTION

An object of the present invention is to provide an X-ray photographic holder for receiving a cassette, setting the cassette in a fixed position, and feeding the set cassette toward a radiographic position.

According to the present invention, an X-ray photographic holder comprises a carriage for receiving a cassette, the carriage being reciprocally movable between a cassette loading position and a radiographic position, a pair of grippers on the carriage at least one gripper being movable in a direction perpendicular to the carriage moving direction so to grip the cassette on both sides, a single driving means, a plurality of follow pulleys on the carriage and driven by the driving means, a force transmission belt guided by the follow pulleys and connected with at least one of the grippers at a spot, a stopper device for stopping the movement of the carriage so long as the cassette is in the loading position, and a control means for releasing the stopper means based on the detection of the cassette having been gripped by the grippers.

According to the present invention, the movement of the carriage is restricted by the stopper device when the carriage is in a position for loading a cassette. In this position the cassette is placed on the carriage. A force transmission belt is driven by the revolution driving means to move at least one of the grippers to thereby grip the cassette on both sides, thereby setting the cassette in a fixed position. Subsequently the stopper device is released by the control means when the control means detects that the cassette has been gripped by the grippers. The carriage is then driven by the revolution driving means and the belt to move the carriage toward a radiographic position.

According to the present invention, the movement of the carriage is restricted by the stopper device when the carriage is in a position for loading a cassette, a driving force from the revolution driving means is then transmitted to the grippers by way of the force transmission belt to move the grippers, thereby carrying out a cassette positioning, and after completion of this positioning the stopper means is released. The driving force of the driving means is transmitted to the carriage through the belt so as to move the carriage toward a radiographic position, such that the final positioning of the cassette can be automatically carried out.

A further object of the invention is to simplify the construction of an X-ray photographic holder by using a common single driving means both for moving the grippers thereby to conduct an initial step of positioning the cassette, and for moving the carriage toward a radiographic position.

A preferred embodiment of the present invention is hereinafter described with reference to the accompanying drawings.

DETAILED DESCRIPTION OF THE DRAWINGS

Figure 1:
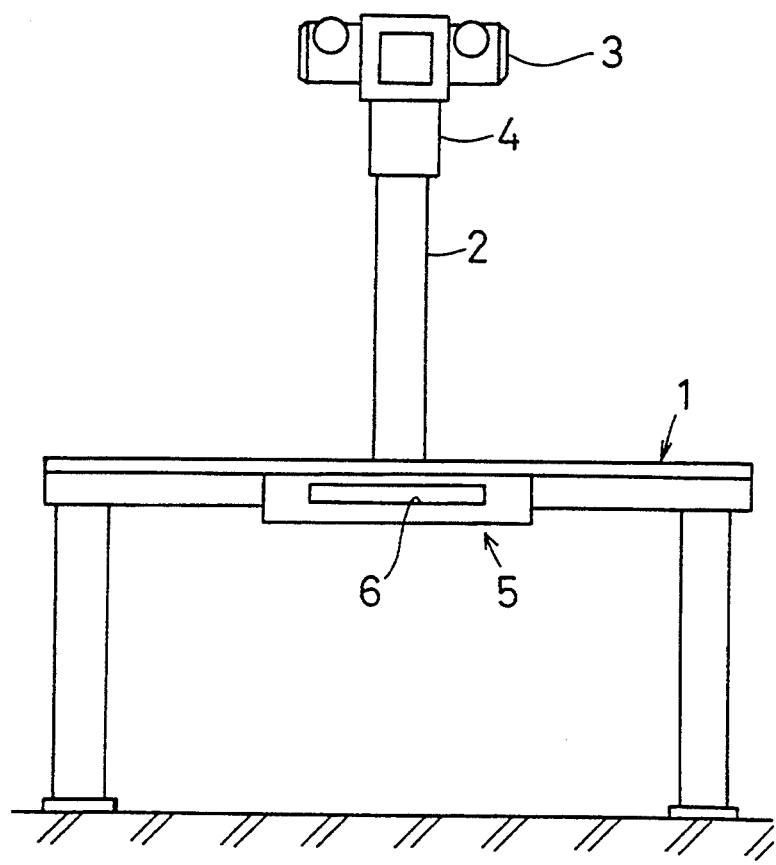
FIG. 1 is a front view showing the diagrammatical configuration of an X-ray photographic equipment adapted to use a cassette according to the present invention.

Referring to the drawings and FIG. 1, an upright support column 2 is provided on a bed 1 which also supports an object (not shown) to be examined. On the extremity of the support column 2 an X-ray tube 3 and a collimeter 4 are mounted, the latter being provided for adjusting an X-ray radiation field. On the lower portion of the bed 1 is a cassette transport device 5 having a cassette insertion aperture 6 for receiving a cassette.

Figure 3:
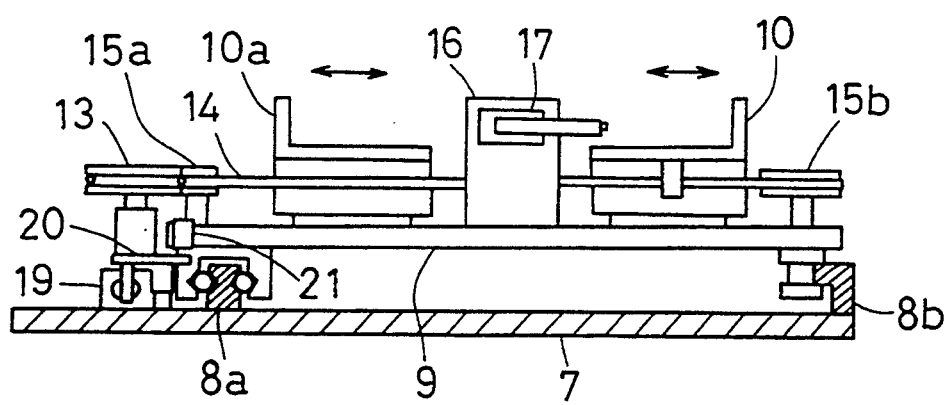
FIG. 3 is a sectional view taken on arrow line III—III of FIG. 2.
Figure 4:
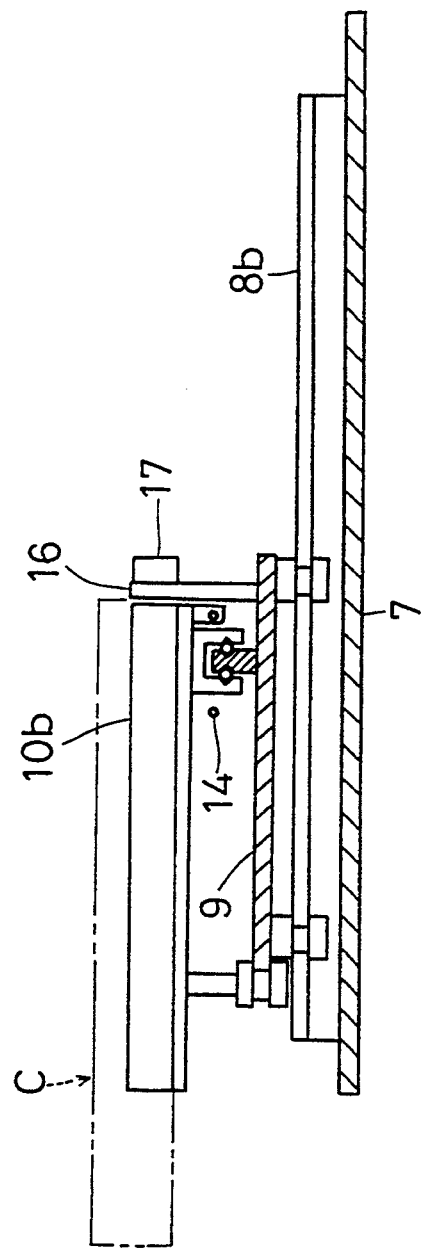
FIG. 4 is a sectional view taken on arrow line IV—IV of FIG. 2.

The cassette transport device according to the present invention is described as follows by referring to FIGS. 2-4.

Figure 2:
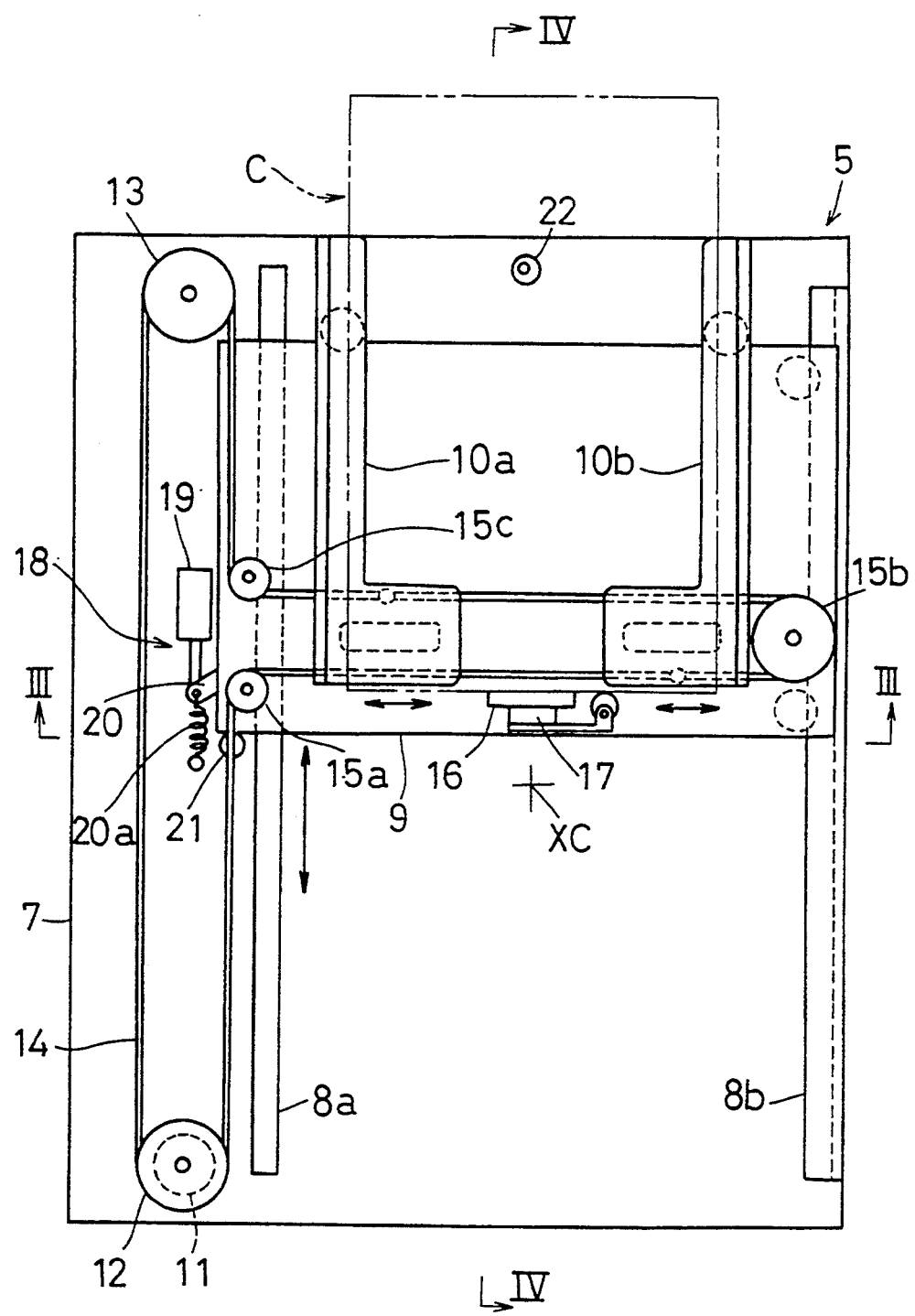
FIG. 2 is a plan view of a cassette transport device according to the present invention.

In FIG. 2, reference number 7 denotes a housing wherein the cassette transport device 5 is provided. The upper side of FIG. 2 corresponds to the side of the cassette in which the insertion aperture 6 is located. A reference symbol XC denotes an X-ray radiographic center (X-ray exposure position). The housing 7 supports a pair of guide rails 8a, 8b which are parallel to each other and directed from the side of the cassette insertion aperture 6 toward the X-ray radiographic position XC. A carriage 9 is mounted slidably along the respective rails 8a, 8b, and a cassette C shown by a two-dotted chain line is placed on the carriage 9.

A pair of grippers 10a, 10b are provided on carriage 9. The grippers are movable in a direction perpendicular to the travelling direction of the carriage 9, so to grip the cassette C on both sides. The housing 7 supports a motor 11 which serves as a single revolution driving means. A pulley 12 is reversibly driven by the motor 11. An endless belt 14, which serves as a force transmission means, engages pulley 12 and a follow pulley 13. The belt 14 is engaged additionally with pulleys 15a, 15b and 15c as follow rotators provided on the carriage 9. A part of the belt 14 extending from the pulley 15a to the pulley 15b is connected with the gripper 10b at a spot, while another part of the belt 14 extending from the pulley 15b to the pulley 15c is connected with the other gripper 10a at another spot.

At the inner side of the carriage 9 (the side of the radiographic position XC), a receiver 16 is provided to receive the inserted cassette C and on the receiver 16 is mounted a sensor means, for example, microswitch 17 for detecting contact of the receiver 16 with the cassette C.

In addition, a stopper device 18 is provided on housing 7 to stop the travelling of the carriage 9 so long as the carriage 9 is in the cassette loading position (the position of the carriage 9 shown in FIG. 2). This stopper device comprises a solenoid 19, an L-shaped lever 20 having one end thereof connected with a rod of the solenoid 19 and driven to swing and a contact pin 21 connected with the other end of the lever 20. Further, at the forward side of the housing 7 (at the side of the cassette insertion aperture 6) a photosensor 22, for example a sensor having a light emission member and a light receiving member, is mounted to detect the rear end of the cassette C when the cassette C is moved and brought toward the radiographic position XC.

Figure 5:
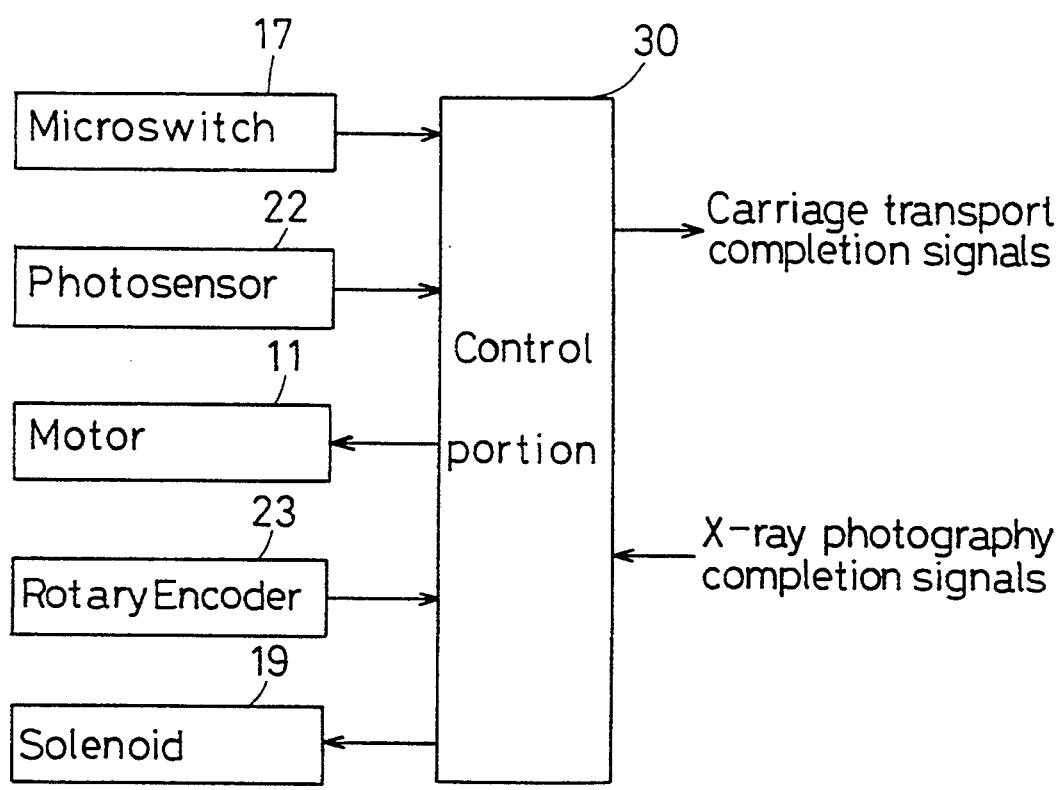
FIG. 5 is a block diagram showing a control portion of the cassette transport device according to the present invention.

In FIG. 5, a microprocessor-based control portion 30 receives the respective detection signals from the microswitch 17, photosensor 22 and a rotary encoder 23 which detects the number of revolutions the motor 11 provides, and controls the motor 11 and the solenoid 19. In addition, the control portion 30 transmits a signal indicating the finish or completion of the travelling of the cassette C to an X-ray photographic controller (not shown), while the control portion 30 receives from the X-ray photographic controller a signal indicating the finish or completion of an X-ray radiography.

An operation of the above described cassette transport device according to the present invention is explained as below:

In an initial state (when the cassette C is loaded), the carriage 9 is in the loading position of the cassette C as shown in FIG. 2, and the solenoid 19 of the stopper device 18 is not supplied with electricity. The lever 20 is pulled by a spring 20a so that travelling of the carriage 9 is restricted by the contact pin 21. In this state, a cassette C is inserted into the cassette insertion aperture 6 by an operator. When the cassette C is placed in abutment with the receiver 16, then the microswitch 17 is switched, for example, to an on-state and the control portion 30 drives the motor 11 in the normal direction (clockwise in FIG. 2). The motor drives belt 14 and the grippers 10a, 10b are moved toward one another so as to grip the cassette C on both sides and set the cassette C in a fixed position. In an alternative embodiment the control portion 30 may energize the motor to move the grippers 10a, 10b when the rear end of the cassette C is detected by the photosensor 22.

While the motor 11 is energized and the grippers 10a, 10b are being moved, the control portion 30 receives pulse signals from the rotary encoder 23. When the grippers 10a, 10b come to grip the cassette C, the motor 11 stalls and the pulse signals from the rotary encoder 23 are suspended. The control portion 30 judges, based on the so suspended input, that the cassette C has been gripped by the grippers 10a, 10b. The control portion then actuates the solenoid 19 to release the stopper device 18. As a result, the motor 11 again rotates, so that the carriage 9 is moved in the direction of the radiographic position XC by the force exerted on pulley 15a by the belt 14.

The control portion 30 counts the number of pulse signals generated from the rotary encoder 23 until the rear end of the cassette C is detected by means of the photosensor 22 from a point of the time when the carriage 9 began to move due to the release of the stopper device 18. Since this number of pulse signals is varied as a function of the size of the loaded cassette C, it is possible to obtain information concerning the size of the cassette C, based on the so counted number. It is also possible to know the necessary revolution number of the motor 11 (in other words the pulse number from the rotary encoder 23) in order to transport the center of the already fixed cassette C to the radiographic position XC, when the size of the cassette C is known. For the purpose, the control portion 30 is provided with memory (not shown) having a table of data written in order to read out the revolution number data of the motor 11 corresponding to the counted number. After the size of the loaded cassette C is known, a reference is made to the table of data to read out the revolution number data corresponding to the size of the pertinent cassette. At a point of the time when the inputted pulse number from the rotary encoder 23 corresponds to the read-out revolution number, the motor 11 is instructed to stop. By this, the center of the cassette C is automatically set in a fixed position of the radiographic position XC.

When the cassette C is set in a fixed position of the radiographic position XC, the control portion 30 transmits a signal indicating the finish or completion of its transport to the X-ray photographic controller which is not shown. In response, the X-ray photographic controller carries out an X-ray photograph of the object and then transmits a signal indicating the finish or completion of the photograph after its completion. In response to this signal, the control portion 30 actuates the motor 11 in the reverse direction in order to return the carriage 9 to the loading position of the cassette and then move the grippers 10a, 10b back to their initial state.

According to the aforesaid embodiment, the grippers 10a, 10b are provided movable together. In contrast, one side of the grippers may be fixed on the carriage, while the other side alone is movable. In this case, a cassette can be set in a fixed position, based on the fixedly provided gripper.

We claim:

1. An X-ray photographic holder for holding an X-ray cassette, said holder comprising:
   a carriage having the cassette placed thereon and moving reciprocally between a cassette loading position and a radiographic position;
   a pair of grippers provided on the carriage having at least one gripper movable in the direction perpendicular to a movement of loading and unloading direction of the carriage, thereby to grip the cassette on both sides;

a single revolution driving means;

a plurality of follow pulleys provided on the carriage;

a force transmission belt, driven by said driving means, for moving at least one of said grippers and said carriage, said belt being guided by said follow pulleys and connected with said at least one gripper at a spot;

a stopper device for stopping the movement of the carriage so long as the cassette is in said loading position; and a control means for releasing the stopper device in response to a detecting signal indicating the gripping of the cassette.

2. The X-ray photographic holder as claimed in claim 1 and further comprising:

means for detecting the size of a cassette placed on the carriage; and means for determining the distance the carriage must be moved in order to move a cassette of the detected size from said loading position to a radiographic position.

3. An X-ray photographic holder for holding an X-ray cassette, said holder comprising:

a carriage for receiving a cassette, said carriage being movable between a cassette loading position and a radiographic position;

first and second grippers supported by said carriage, at least said first gripper being movable toward the second gripper in a direction perpendicular to the direction of movement of said carriage as it moves between the cassette loading position and the radiographic position to thereby grip the cassette on opposing sides between said grippers;

a drive motor;

a plurality of follow pulleys on said carriage;

a drive belt guided by said follow pulleys and driven by said drive motor, said drive belt being attached at a point to said first gripper;

a stopper device having a first state in which said stopper device prevents movement of the carriage from said cassette loading position and a second state in which said stopper device does not prevent movement of the carriage from the cassette loading position;

the arrangement of said follow pulleys and the point at which said belt is attached to said first gripper being such that when said motor is energized and said stopper device is in said first state said belt moves said first gripper toward said second gripper without moving said carriage, and when said motor is energized and said stopper device is in said second state said belt moves said carriage.

4. An X-ray photographic holder as claimed in claim 3 wherein said second gripper is attached to said belt for movement opposite to the direction of movement of said first gripper.

5. An X-ray photographic holder as claimed in claim 3 wherein said drive motor is a bi-directional motor.

6. An X-ray photographic holder as claimed in claim 3 and further comprising:

detecting means for detecting the gripping of the cassette by said grippers and producing a signal indicating said gripping; and control means responsive to said signal for changing said stopper device from said first to said second state.

7. An X-ray photographic holder as claimed in claim 6 wherein said second gripper is attached to said belt for movement opposite to the direction of movement of said first gripper.

8. An X-ray photographic holder as claimed in claim 6 wherein said motor is a bi-directional motor.

* * * * *